United States Patent
Oyaizu et al.

(10) Patent No.: US 10,591,594 B2
(45) Date of Patent: Mar. 17, 2020

(54) INFORMATION PROCESSING APPARATUS, INFORMATION PROCESSING METHOD, AND PROGRAM

(71) Applicant: Sony Corporation, Tokyo (JP)

(72) Inventors: Hideki Oyaizu, Tokyo (JP); Takuto Motoyama, Kanagawa (JP); Yasuhiro Sutou, Kanagawa (JP); Toshio Yamazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 57 days.

(21) Appl. No.: 15/762,309

(22) PCT Filed: Sep. 16, 2016

(86) PCT No.: PCT/JP2016/077431
§ 371 (c)(1),
(2) Date: Mar. 22, 2018

(87) PCT Pub. No.: WO2017/057058
PCT Pub. Date: Apr. 6, 2017

(65) Prior Publication Data
US 2018/0284260 A1    Oct. 4, 2018

(30) Foreign Application Priority Data
Sep. 30, 2015   (JP) ................. 2015-194137

(51) Int. Cl.
*G06K 9/00* (2006.01)
*G01S 13/89* (2006.01)
(Continued)

(52) U.S. Cl.
CPC .............. *G01S 13/89* (2013.01); *G01B 11/00* (2013.01); *G01C 3/06* (2013.01); *G01C 3/085* (2013.01);
(Continued)

(58) Field of Classification Search
None
See application file for complete search history.

(56) References Cited

U.S. PATENT DOCUMENTS 9,783,197 B2 * 10/2017 Aoki .................. B60W 30/165
2012/0242835 A1    9/2012 Li et al.
(Continued)

FOREIGN PATENT DOCUMENTS

EP    2 889 641 A1    7/2015
JP    06-230115 A     8/1994
(Continued)

OTHER PUBLICATIONS

Extended European Search Report dated Feb. 13, 2019 in connection with European Application No. 16851232.5.
(Continued)

*Primary Examiner* — Soo Jin Park
(74) *Attorney, Agent, or Firm* — Wolf, Greenfield & Sacks, P.C.

(57) ABSTRACT

The present technology relates to an information processing apparatus, an information processing method, and a program for suppressing the occurrence of false recognition.

A road surface region estimating section estimates a road surface region in a first image captured of a predetermined imaging range. A non-polarized region extracting section extracts a non-polarized region from a second image captured of the imaging range. A low-confidence level region estimating section estimates a low-confidence level region for an object with a low first confidence level obtained by a first sensor within a measurement range of the first sensor in the imaging range on the basis of information indicating the road surface region and the non-polarized region. A weight calculating section calculates a weight on the first confidence level on the basis of the first confidence level, a second confidence level of the object obtained by a second (Continued)

sensor in the imaging range, and information indicating the low-confidence level region. A presence likelihood calculating section calculates presence likelihood of the object at different distances within the imaging range on the basis of the first confidence level, the second confidence level, and information indicating the weight. The present technology is applicable to a vehicle-mounted distance estimating apparatus.

11 Claims, 17 Drawing Sheets

(51) Int. Cl.
| | | |
|---|---|---|
| *G01S 13/86* | (2006.01) | |
| *G01C 3/06* | (2006.01) | |
| *G01B 11/00* | (2006.01) | |
| *G06T 1/00* | (2006.01) | |
| *G08G 1/16* | (2006.01) | |
| *G06T 7/593* | (2017.01) | |
| *G01C 3/08* | (2006.01) | |
| *G01S 13/931* | (2020.01) | |
| *G06K 9/46* | (2006.01) | |
| *G01S 13/93* | (2020.01) | |

(52) U.S. Cl.
CPC ............ *G01S 13/86* (2013.01); *G01S 13/867* (2013.01); *G01S 13/931* (2013.01); *G06K 9/00798* (2013.01); *G06K 9/00805* (2013.01); *G06K 9/4661* (2013.01); *G06T 1/00* (2013.01); *G06T 7/593* (2017.01); *G08G 1/16* (2013.01); *G01S 13/93* (2013.01); *G06T 2207/10012* (2013.01); *G06T 2207/10028* (2013.01); *G06T 2207/20076* (2013.01); *G06T 2207/30261* (2013.01)

(56) References Cited

U.S. PATENT DOCUMENTS

2013/0136306 A1  5/2013  Li et al.
2016/0307026 A1* 10/2016  Nishijima ............ G01S 13/867

FOREIGN PATENT DOCUMENTS

| JP | 2007-310741 A | 11/2007 |
|---|---|---|
| JP | 2008-116357 A | 5/2008 |
| JP | 2011-150689 A | 8/2011 |
| JP | 2012-033149 A | 2/2012 |
| JP | 2015-143979 A | 8/2015 |
| WO | WO 2011/078300 A1 | 6/2011 |
| WO | WO 2012/002552 A1 | 1/2012 |

OTHER PUBLICATIONS

Written Opinion and English translation thereof dated Dec. 20, 2016 in connection with International Application No. PCT/JP2016/077431.
International Preliminary Report on Patentability and English translation thereof dated Apr. 12, 2018 in connection with International Application No. PCT/JP2016/077431.
International Search Report and English translation thereof dated Dec. 20, 2016 in connection with International Application No. PCT/JP2016/077431.

* cited by examiner

# INFORMATION PROCESSING APPARATUS, INFORMATION PROCESSING METHOD, AND PROGRAM

CROSS REFERENCE TO RELATED APPLICATIONS

This application claims the benefit under 35 U.S.C. § 371 as a U.S. National Stage Entry of International Application No. PCT/JP2016/077431, filed in the Japanese Patent Office as a Receiving Office on Sep. 16, 2016, which claims priority to Japanese Patent Application Number JP2015-194137, filed in the Japanese Patent Office on Sep. 30, 2015, each of which is hereby incorporated by reference in its entirety.

TECHNICAL FIELD

The present technology relates to an information processing apparatus, an information processing method, and a program. More particularly, the technology relates to an information processing apparatus, an information processing method, and a program for suppressing the occurrence of false recognition.

BACKGROUND ART

Stereo cameras and millimeter-wave radars are commonly used as vehicle-mounted distance sensors. However, these devices have their own share of problems: the stereo camera loses its accuracy in dark places and at long distances, and the millimeter-wave radar has trouble dealing with multiple reflection in tunnels, for example, and has difficulty in acquiring information in the vertical direction.

Meanwhile, technologies have been disclosed which fuse the information obtained from these two types of distance sensors. The disclosed technologies are aimed at getting each of the two sensors to compensate for the conditions and ranges in which the other sensor is not strong.

For example, PTL 1 discloses technologies by which, if the distance information from the radar and that from the stereo camera are to be merged and if there is a long distance to an object, the confidence level of the radar-derived information is raised in order to increase the lateral position accuracy of the object. If there is a short distance to the object, the technologies involve raising the confidence level of the information from the stereo camera because there is no knowing how exactly the radio waves of the radar are reflected by the nearby object.

Further, PTL 2 states that the probabilities of the presence of a solid object obtained from the outputs of multiple sensors are corrected on the basis of the recognition rates of the sensors or are varied in a weighted manner depending on the traveling environment, before the probabilities are fused.

Further, PTL 3 discusses measures to be taken when the vehicle ahead being tracked by adaptive cruise control is off the range of detection of a millimeter-wave radar. Specifically, if the own vehicle is determined to be in a traffic intersection by a GPS (Global Positioning System), the confidence level of the millimeter-wave radar is lowered while the confidence level of a stereo camera is raised at the same time. The measures are intended to keep an appropriate distance between vehicles.

CITATION LIST

Patent Literature

[PTL 1]
  JP2008-116357A
[PTL 2]
  JP2007-310741A
[PTL 3]
  JP1994-230115A

SUMMARY

Technical Problem

As mentioned above, the millimeter-wave radar has difficulty in acquiring information in the vertical direction. Specifically, the millimeter-wave radar has its range of measurement limited in the up-down direction so as not to detect those objects on the road surface or at an elevated location which are not likely to pose the possibility of collision with the own vehicle.

However, for example, it might happen that a piece of metal such as a manhole cover or a grating is buried in an uphill road surface ahead of the own vehicle. In that case, the millimeter waves from the millimeter-wave radar are reflected by the piece of metal. As a result, the metal is falsely recognized as an obstacle, which activates automatic brakes.

In contrast, the estimation of distance by the stereo camera involves estimating a road surface in order to determine whether or not the piece of metal is an object on that road surface. However, given the absence of the means to determine which of the two kinds of information from the millimeter-wave radar and from the stereo camera is correct, such a piece of metal might ultimately be recognized as an obstacle.

The present technology has been devised in view of the above circumstances. An object of the technology is therefore to suppress the occurrence of false recognition.

Solution to Problem

According to one aspect of the present technology, there is provided an information processing apparatus including: a road surface region estimating section configured to estimate a road surface region in a first image captured of a predetermined imaging range; a non-polarized region extracting section configured to extract a non-polarized region from a second image captured of the imaging range; a low-confidence level region estimating section configured to estimate a low-confidence level region for an object with a low first confidence level obtained by a first sensor within a measurement range of the first sensor in the imaging range on the basis of information indicating the road surface region and the non-polarized region; a weight calculating section configured to calculate a weight on the first confidence level on the basis of the first confidence level, a second confidence level of the object obtained by a second sensor in the imaging range, and information indicating the low-confidence level region; and a presence likelihood calculating section configured to calculate presence likelihood of the object at different distances within the imaging range on the basis of the first confidence level, the second confidence level, and information indicating the weight.

According to one aspect of the present technology, there is provided an information processing method including the steps of: estimating a road surface region in a first image captured of a predetermined imaging range; extracting a non-polarized region from a second image captured of the imaging range; estimating a low-confidence level region for an object with a low first confidence level obtained by a first sensor within a measurement range of the first sensor in the imaging range on the basis of information indicating the road surface region and the non-polarized region; calculating a weight on the first confidence level on the basis of the first confidence level, a second confidence level of the object obtained by a second sensor in the imaging range, and information indicating the low-confidence level region; and calculating presence likelihood of the object at different distances within the imaging range on the basis of the first confidence level, the second confidence level, and information indicating the weight.

According to one aspect of the present technology, there is provided a program causing a computer to execute a process including the steps of: estimating a road surface region in a first image captured of a predetermined imaging range; extracting a non-polarized region from a second image captured of the imaging range; estimating a low-confidence level region for an object with a low first confidence level obtained by a first sensor within a measurement range of the first sensor in the imaging range on the basis of information indicating the road surface region and the non-polarized region; calculating a weight on the first confidence level on the basis of the first confidence level, a second confidence level of the object obtained by a second sensor in the imaging range, and information indicating the low-confidence level region; and calculating presence likelihood of the object at different distances within the imaging range on the basis of the first confidence level, the second confidence level, and information indicating the weight.

According to one aspect of the present technology, a road surface region in a first image captured of a predetermined imaging range is first estimated. A non-polarized region is extracted from a second image captured of the imaging range. A low-confidence level region for an object with a low first confidence level obtained by a first sensor is estimated within a measurement range of the first sensor in the imaging range on the basis of information indicating the road surface region and the non-polarized region. A weight on the first confidence level is calculated on the basis of the first confidence level, a second confidence level of the object obtained by a second sensor in the imaging range, and information indicating the low-confidence level region. Presence likelihood of the object at different distances within the imaging range is then calculated on the basis of the first confidence level, the second confidence level, and information indicating the weight.

Advantageous Effect of Invention

According to one aspect of the present technology, it is possible to suppress the occurrence of false recognition.

DESCRIPTION OF EMBODIMENT

A preferred embodiment of the present technology is described below with reference to the accompanying drawings.

<Typical Configuration of the Distance Estimating Apparatus>

Figure 1:
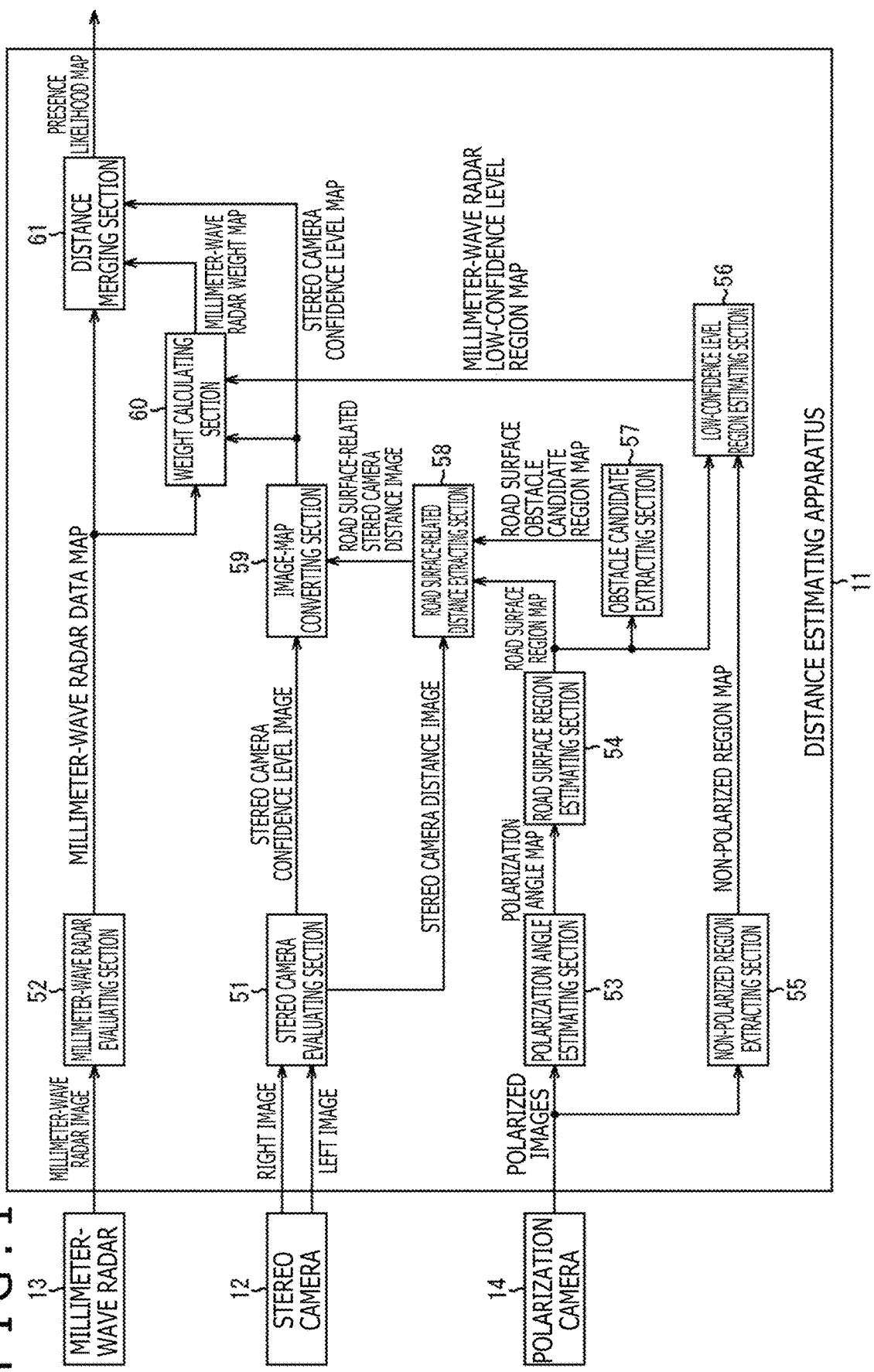
FIG. 1 is a block diagram depicting a typical configuration of a distance estimating apparatus according to an embodiment.

FIG. 1 depicts a typical configuration of a distance estimating apparatus as an information processing apparatus according to the embodiment.

A distance estimating apparatus 11, mounted on board a vehicle such as a car, constitutes part of what is known as an electronic control unit (ECU). On the basis of signals from various sensors, the distance estimating apparatus 11 estimates the distance to an object such as the vehicle traveling ahead of the own vehicle. This embodiment has a stereo camera 12, a millimeter-wave radar 13, and a polarization camera 14 mounted on board the vehicle as three types of sensors with different detection characteristics.

The stereo camera 12 includes a pair of cameras disposed right and left at a predetermined baseline length apart, the paired cameras being furnished with solid-state imaging devices (CMOS (Complementary Metal Oxide Semiconductor) image sensors or CCD (Charge Coupled Device) image sensors). The stereo camera 12 images a vehicle exterior landscape from different points of view. The stereo camera 12 is attached above the rearview mirror, for example, in the vehicle interior. A right image and a left image captured of the vehicle exterior landscape are supplied to the distance estimating apparatus 11.

The millimeter-wave radar 13 detects objects ahead using millimeter waves. The millimeter-wave radar 13 is attached at the front end of the vehicle, for example, approximately in the middle of the vehicle width. The millimeter-wave radar 13 emits millimeter waves in front of the own vehicle and receives the reflected millimeter waves from the rear end of each object ahead. Then, by measuring the time from the emission to the reception, the millimeter-wave radar 13 calculates the distance between the front end of the own vehicle and the rear end of the object ahead. The millimeter-wave radar 13 supplies the distance estimating apparatus 11 with a signal representing the calculated distance in the form of a millimeter-wave radar image.

The polarization camera 14 supplies the distance estimating apparatus 11 with images having passed polarization filters in at least three directions. Specifically, the polarization camera 14 includes a polarizer array that combines at least three polarizers forming a unit (polarizer unit) and having different transmission axes. The polarizer array allows the individual polarizers to let pass non-polarized components of incident input light as well as its polarization components of which the polarizing directions vary depending on the polarizer. In this manner, the polarization camera 14 simultaneously captures polarized images in different polarizing directions and supplies the captured images to the distance estimating apparatus 11.

Incidentally, the imaging ranges of the images obtained by the stereo camera 12 and polarization camera 14 are basically the same. The imaging range of the image obtained by the millimeter-wave radar is more limited in the up-down direction than the imaging range of the images acquired by the stereo camera 12 and polarization camera 14.

A detailed configuration of the distance estimating apparatus 11 is explained below.

The distance estimating apparatus 11 includes a stereo camera evaluating section 51, a millimeter-wave radar evaluating section 52, a polarization angle estimating section 53, a road surface region estimating section 54, a non-polarized region extracting section 55, a low-confidence level region estimating section 56, an obstacle candidate extracting section 57, a road surface-related distance extracting section 58, an image-map converting section 59, a weight calculating section 60, and a distance merging section 61.

The stereo camera evaluating section 51 generates a stereo camera distance image and a stereo camera confidence level image on the basis of the right and left images supplied from the stereo camera 12. The stereo camera evaluating section 51 supplies the stereo camera distance image to the road surface-related distance extracting section 58 and the stereo camera confidence level image to the image-map converting section 59. The stereo camera distance image and the stereo camera confidence level image will be discussed later in detail.

The millimeter-wave radar evaluating section 52 generates a millimeter-wave radar data map on the basis of the millimeter-wave radar image supplied from the millimeter-wave radar 13. The millimeter-wave radar evaluating section 52 supplies the millimeter-wave radar data map to the weight calculating section 60 and distance merging section 61. The millimeter-wave radar data map will be discussed later in detail.

On the basis of the polarized images supplied from the polarization camera 14, the polarization angle estimating section 53 generates a polarization angle map indicating the polarization angles of objects in the polarized images. The polarization angle estimating section 53 supplies the polarization angle map to the road surface region estimating section 54.

The road surface region estimating section 54 estimates regions of the road surface (road surface region) in the polarized images on the basis of the polarization angle map supplied from the polarization angle estimating section 53. The road surface region estimating section 54 supplies a road surface region map indicating the road surface region in the polarized images to the low-confidence level region estimating section 56, obstacle candidate extracting section 57, and road surface-related distance extracting section 58.

On the basis of the polarized images supplied from the polarization camera 14, the non-polarized region extracting section 55 extracts pixel regions with limited variations in polarization component intensity as non-polarized regions in the polarized images. The non-polarized region extracting section 55 supplies the low-confidence level region estimating section 56 with a non-polarized region map indicating the non-polarized regions.

The low-confidence level region estimating section 56 estimates low-confidence level regions where the confidence level is low in the millimeter-wave radar data map on the basis of the road surface region map supplied from the road surface region estimating section 54 and on the non-polarized region map from the non-polarized region extracting section 55. The low-confidence level region estimating section 56 supplies the weight calculating section 60 with a millimeter-wave radar low-confidence level region map indicating the low-confidence level regions.

On the basis of the road surface region map supplied from the road surface region estimating section 54, the obstacle candidate extracting section 57 extracts the regions constituting obstacle candidates in the road surface region. The obstacle candidate extracting section 57 supplies the road surface-related distance extracting section 58 with a road surface obstacle candidate region map indicating the obstacle candidate regions.

The road surface-related distance extracting section 58 extracts distance information about the regions excluding those regarded as the road surface in the stereo camera distance image supplied from the stereo camera evaluating section 51 on the basis of the road surface region map supplied from the road surface region estimating section 54 and the road surface obstacle candidate region map from the obstacle candidate extracting section 57. The road surface-related distance extracting section 58 supplies the image-map converting section 59 with the stereo camera distance image as a road surface-related stereo camera distance image from which is extracted the distance information about the regions excluding those regarded as the road surface.

The image-map converting section 59 generates a stereo camera confidence level map on the basis of the stereo camera confidence level image supplied from the stereo camera evaluating section 51 and on the road surface-related stereo camera distance image from the road surface-related distance extracting section 58. The image-map converting section 59 supplies the stereo camera confidence level map to the weight calculating section 60 and distance merging section 61.

The weight calculating section 60 calculates a weight on the millimeter-wave radar data map on the basis of the millimeter-wave radar data map supplied from the millimeter-wave radar evaluating section 52, on the millimeter-wave radar low-confidence level region map from the low-confidence level region estimating section 56, and on the stereo camera confidence level map from the image-map converting section 59. The weight calculating section 60 supplies the distance merging section 61 with a millimeter-wave radar weight map weighted with respect to the millimeter-wave radar data map.

The distance merging section 61 calculates the presence likelihood of an object at each different distance within the imaging range on the basis of the millimeter-wave radar data map supplied from the millimeter-wave radar evaluating section 52, on the stereo camera confidence level map from the image-map converting section 59, and on the millimeter-wave radar weight map from the weight calculating section 60. The distance merging section 61 output a presence likelihood map indicating the presence likelihood of objects at different distances within the imaging range.

<Distance Estimation Process>

A distance estimation process performed by the distance estimating apparatus 11 is described below. Incidentally, in the ensuing description, the landscape depicted in FIG. 2 is assumed to be imaged by the stereo camera 12, by the millimeter-wave radar 13, and by the polarization camera 14.

Figure 2:
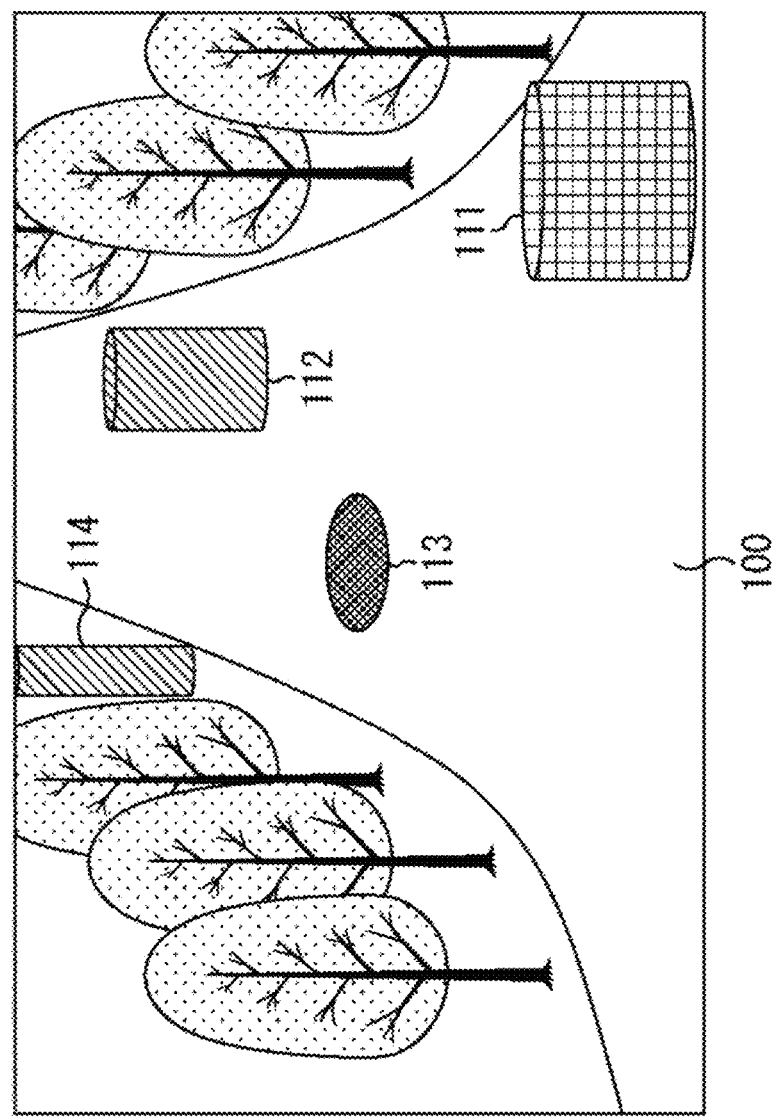
FIG. 2 is an explanatory diagram explaining a landscape to be imaged.

In FIG. 2, a nonmetallic obstacle 111, a metallic obstacle 112, and a metallic manhole cover 113 are present on an uphill road surface 100. Further, outside the road surface 100 are a metallic obstacle 114 and trees. With existing technology, millimeter waves from the millimeter-wave radar 13 are reflected by the manhole cover 113, so that the manhole cover 113 is falsely recognized as an obstacle.

Figure 3:
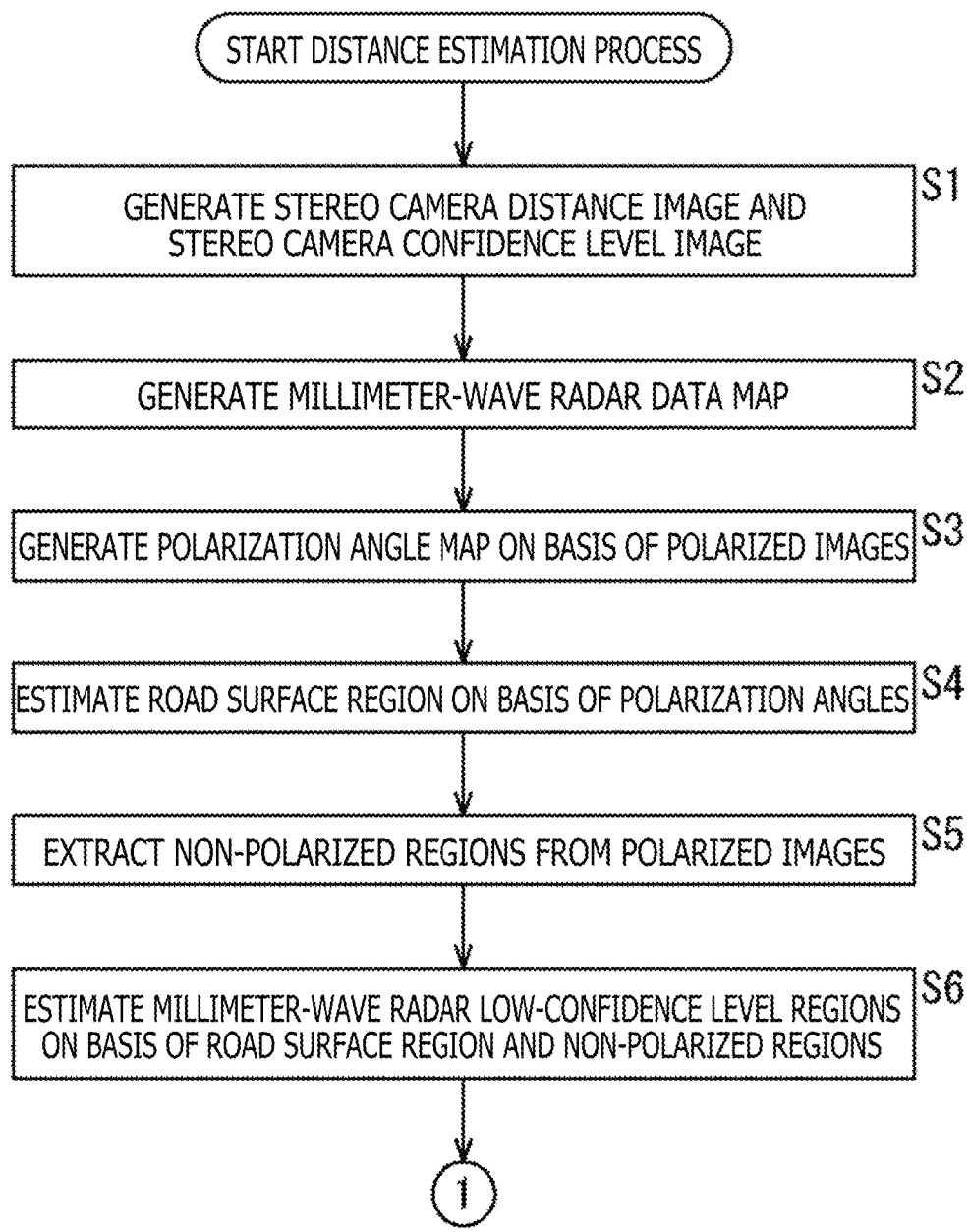
FIG. 3 is a flowchart explaining a distance estimation process.
Figure 4:
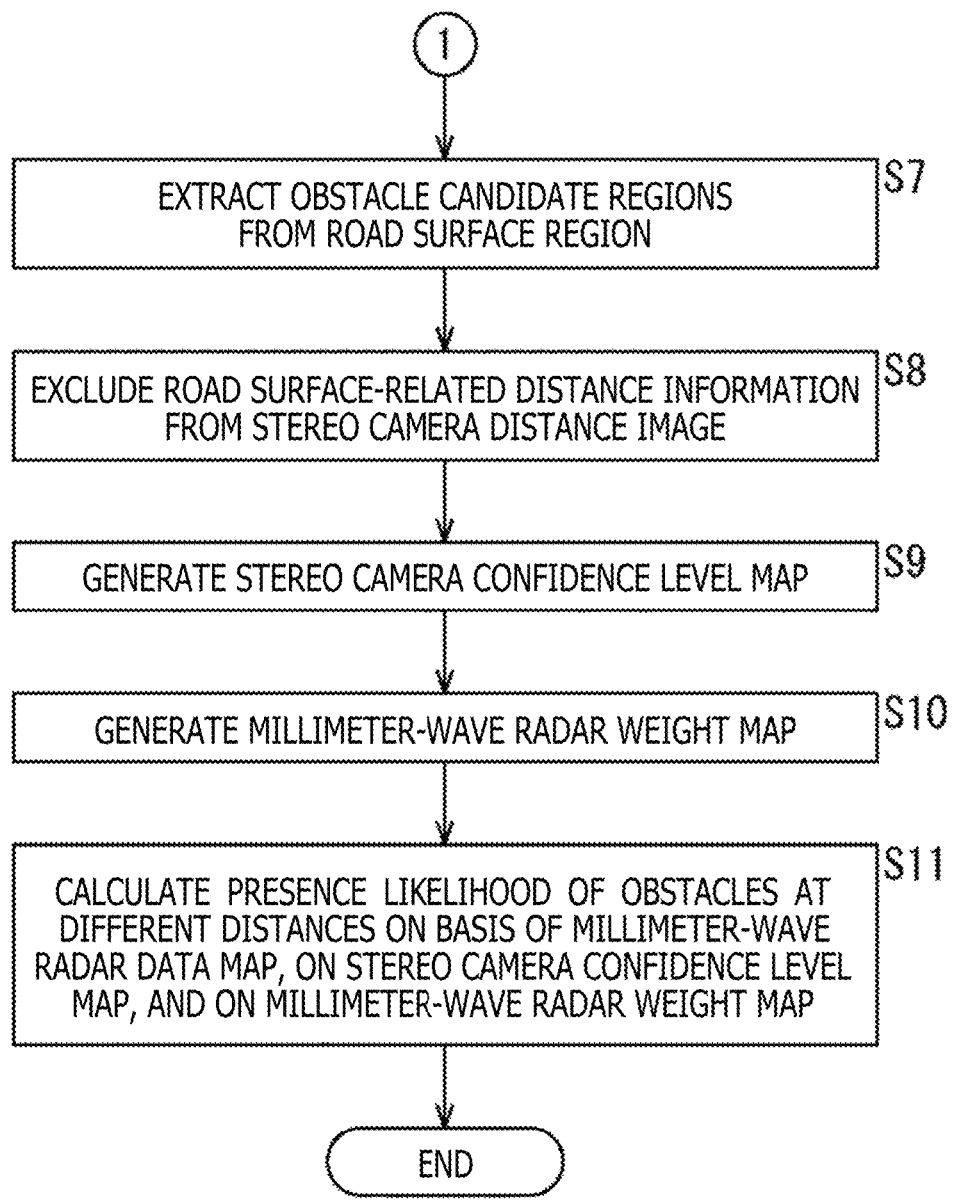
FIG. 4 is another flowchart explaining the distance estimation process.

FIGS. 3 and 4 depict flowcharts explaining the distance estimation process.

In step S1, the stereo camera evaluating section 51 generates a stereo camera distance image and a stereo camera confidence level image on the basis of the right and left images supplied from the stereo camera 12.

Figure 5:
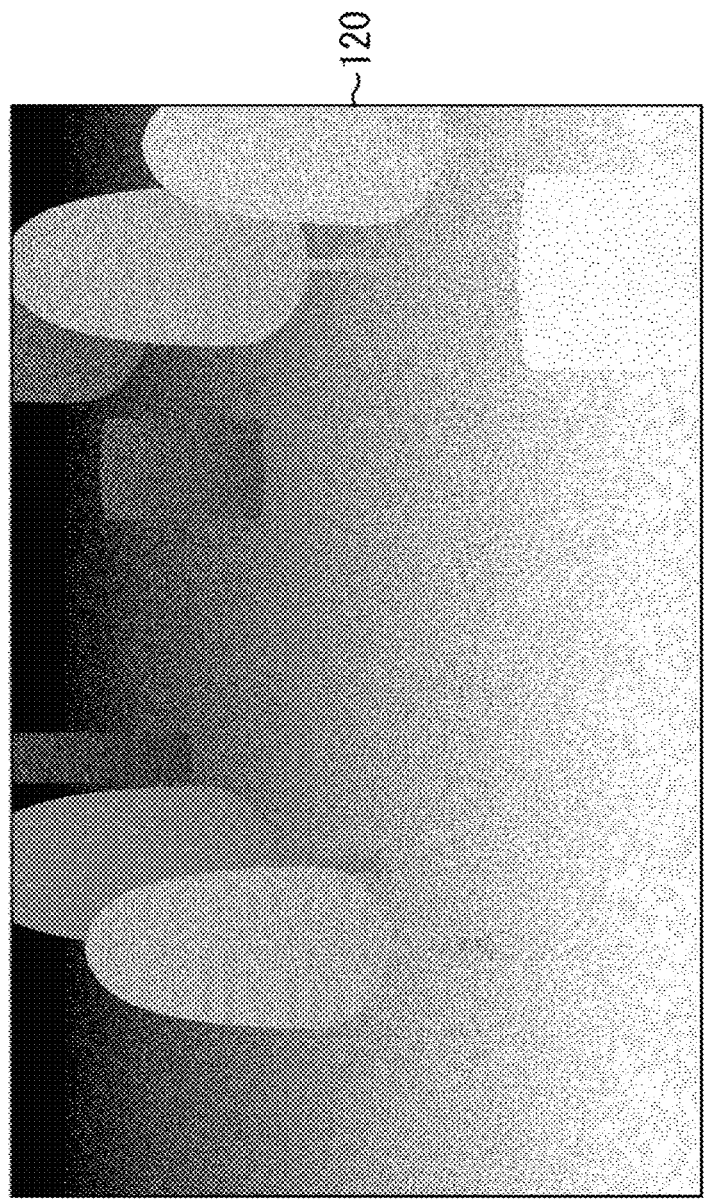
FIG. 5 is a schematic diagram depicting a typical stereo camera distance image.

FIG. 5 depicts a typical stereo camera distance image.

The stereo camera distance image 120 depicted in FIG. 5 indicates that the darker the region, the more distant the object corresponding to that region is located.

Figure 6:
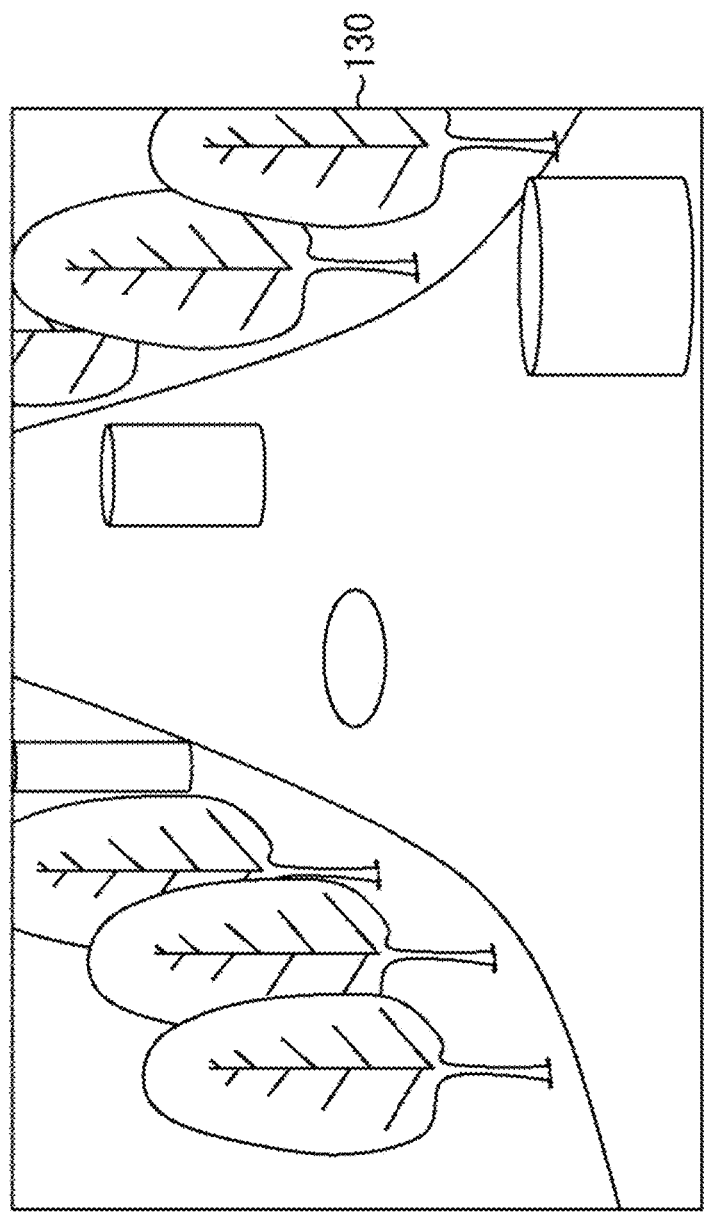
FIG. 6 is a schematic diagram depicting a typical stereo camera confidence level image.

FIG. 6 depicts a typical stereo camera confidence level image.

The stereo camera confidence level image indicates the confidence levels of the measurement of distance by the stereo camera 12. Values are high for the edge and texture portions in the image. For example, the values of the stereo camera confidence level image are calculated on the basis of stereo matching correlation values from the stereo camera 12. In the stereo camera confidence level image 130 of FIG. 6, the darker the region, the higher the confidence level corresponding to that region. In distance estimation involving the use of a stereo camera, distance is estimated on the basis of the parallax between right and left images. For that reason, flat or dark portions in the image have low confidence levels, while sharp edge portions have high confidence levels.

Incidentally, the levels of the stereo camera confidence level image may also be calculated from the contrast of a target image or from its texture intensity, i.e., from any parameter that may raise the confidence level of distance estimation by the stereo camera.

The stereo camera distance image thus generated is supplied to the road surface-related distance extracting section 58. The stereo camera confidence level image is supplied to the image-map converting section 59.

Incidentally, the stereo camera 12 may be replaced with an ultrasonic sensor or a laser radar. The output from such an alternative device may be used as the basis for generating images that replace the stereo camera distance image or the stereo camera confidence level image.

Returning to the flowchart of FIG. 3, in step S2, the millimeter-wave radar evaluating section 52 generates a millimeter-wave radar data map on the basis of the millimeter-wave radar image supplied from the millimeter-wave radar 13. The millimeter-wave radar data map indicates the locations of objects and the reflection intensity of reflected millimeter waves therefrom.

The values of the millimeter-wave radar data map are calculated on the basis of the reflection intensity of the millimeter-wave radar 13, for example. With the millimeter-wave radar, the reflection intensity of reflected waves from objects such as metallic objects is high. Signals representing the distances calculated on the basis of the reflection intensity tend to have high confidence levels.

Using the millimeter-wave radar data map thus makes it possible to detect objects such as metals reflecting large quantities of millimeter waves on the road surface or in other regions.

Figure 7:
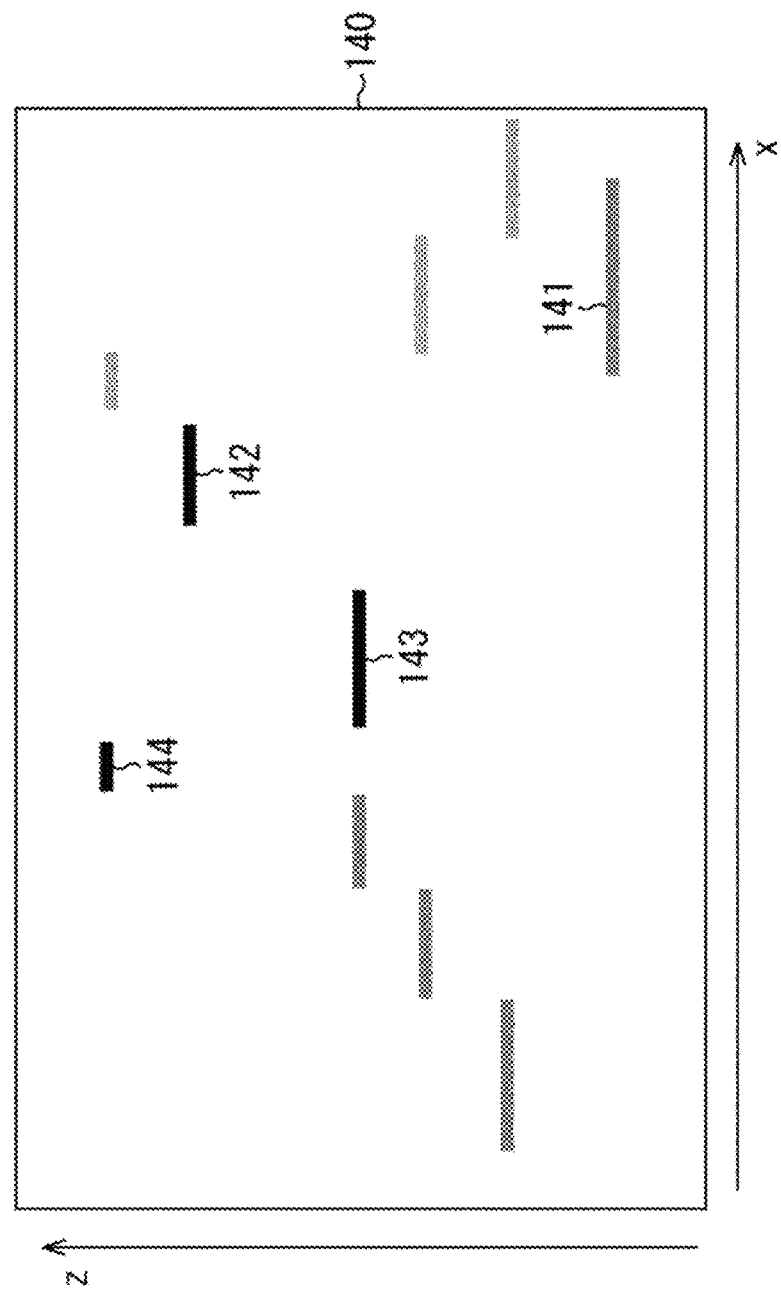
FIG. 7 is a schematic diagram depicting a typical millimeter-wave radar data map.

FIG. 7 depicts a typical millimeter-wave radar data map.

In a millimeter-wave radar data map 140 depicted in FIG. 7, the horizontal axis (x-axis) denotes the horizontal direction in FIG. 2 and the vertical axis (z-axis) represents the depth direction in FIG. 2. The millimeter-wave radar data map 140 in FIG. 7 indicates that the darker the region, the higher the confidence level of the object corresponding to that region.

That is, in the example of FIG. 7, the confidence levels are the highest for regions 142, 143, and 144 corresponding respectively to the metallic obstacle 112, manhole cover 113, and metallic obstacle 114 each including a metal having high millimeter-wave reflection intensity in FIG. 2. A region 141 corresponding to the nonmetallic obstacle 111 has the second highest confidence level. Incidentally, confidence levels are not very high for the regions corresponding to the trees in FIG. 2.

The millimeter-wave radar data map thus generated is supplied to the weight calculating section 60 and distance merging section 61.

Returning to the flowchart of FIG. 3, in step S3, the polarization angle estimating section 53 generates a polarization angle map on the basis of the polarized images supplied from the polarization camera 14.

Using the mathematical model disclosed in Japanese Patent No. 4974543, for example, the polarization angle estimating section 53 separates the polarized component intensity and non-polarized component intensity from the polarized images. On the basis of the phase of the polarized component intensity indicated by the mathematical model, the polarization angle estimating section 53 estimates the polarization angle of each object in the polarized images.

Figure 8:
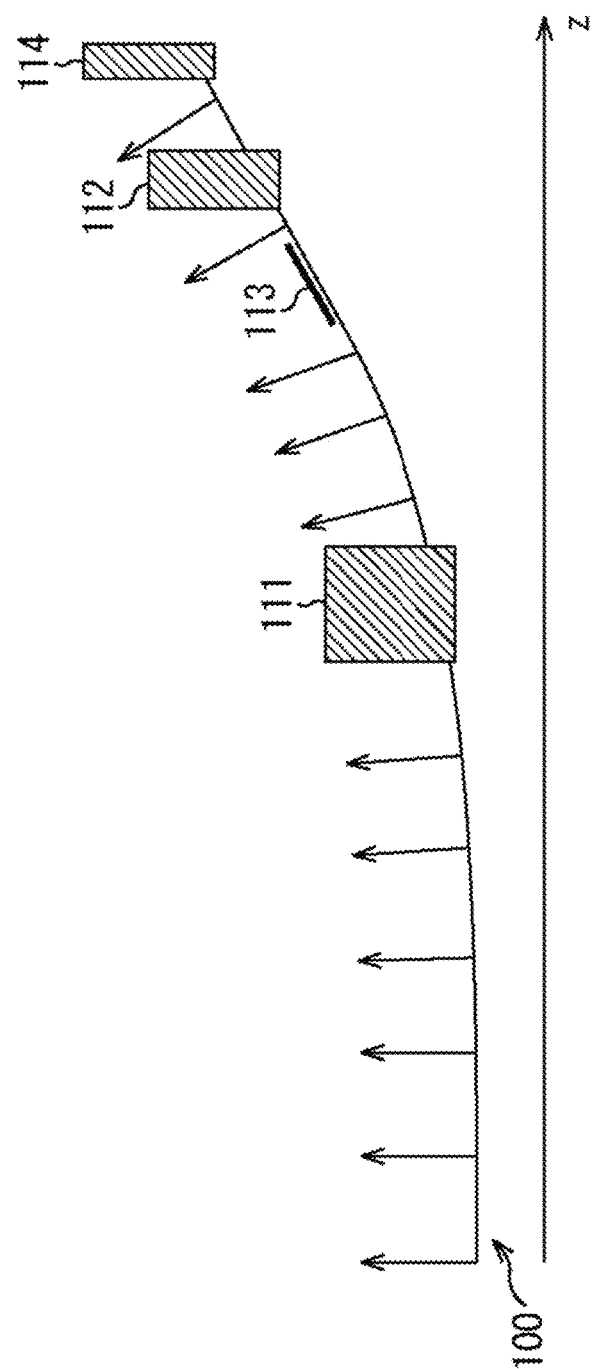
FIG. 8 is a schematic diagram depicting typical polarization angles.

FIG. 8 depicts typical polarization angles.

In FIG. 8, the polarization angles indicated by arrows are depicted to be uniform in segments on the near side along the z-axis on the road surface 100 in FIG. 2. In segments on the far side (uphill) along the z-axis on the road surface 100, the polarization angles indicated by arrows are depicted to vary successively.

The polarization angle map indicating the polarization angles thus estimated is supplied to the road surface region estimating section 54.

Returning to the flowchart of FIG. 3, in step S4, the road surface region estimating section 54 estimates the road surface region in the polarized images on the basis of the polarization angles indicated by the polarization angle map supplied from the polarization angle estimating section 53.

Specifically, the road surface region estimating section 54 detects those segments in the polarized images where the polarization angles indicated by the polarization angle map appear to be uniform or vary successively over a predetermined range. The road surface region estimating section 54 then generates a road surface region map having the detected segments as the road surface region in the polarized images. The road surface region map indicates the road surface region distinguished from other regions. In this example, a region with its polarization angle approximately perpendicular and regions contiguous therewith are regarded as constituting the road surface region.

Figure 9:
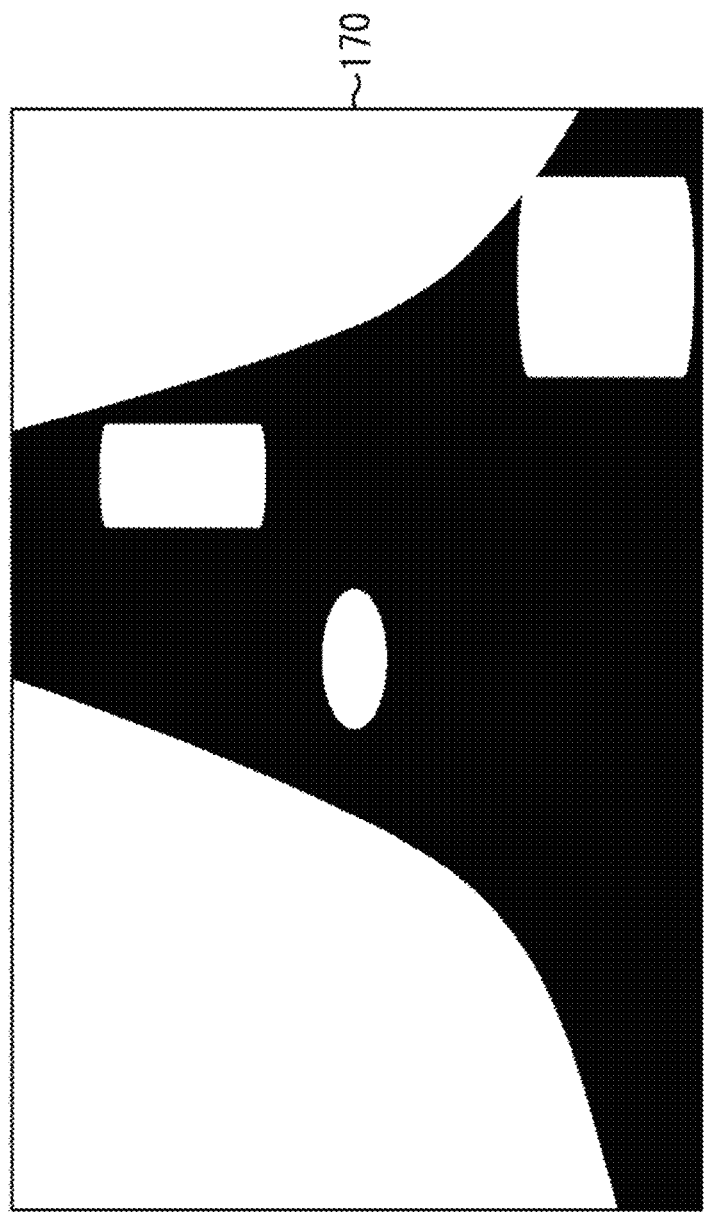
FIG. 9 is a schematic diagram depicting a typical road surface region map.

FIG. 9 depicts a typical road surface region map.

In a road surface region map 170 of FIG. 9, a dark region is considered the road surface region. The dark region in the road surface region map 170 corresponds to the segments excluding the nonmetallic obstacle 111, metallic obstacle 112, and metallic manhole cover 113 from the road surface 100 in FIG. 2.

The road surface region map thus generated is supplied to the low-confidence level region estimating section 56, obstacle candidate extracting section 57, and road surface-related distance extracting section 58.

Incidentally, whereas it was explained above that the road surface region estimating section 54 estimates the road surface region on the basis of the polarized images, the road surface region estimating section 54 may alternatively estimate the road surface region on the basis of the right and left images obtained by the stereo camera 12, for example.

Returning to the flowchart of FIG. 3, in step S5, the non-polarized region extracting section 55 extracts non-polarized regions from the polarized images supplied from the polarization camera 14, thereby generating a non-polarized region map indicating the non-polarized regions. The non-polarized region map indicates the regions that manifest or appear to manifest (approximately) the same phase images in the polarized images captured by the polarization camera 14. In other words, the non-polarized region map indicates the pixel regions where the variation of the polarized component intensity is small.

Figure 10:
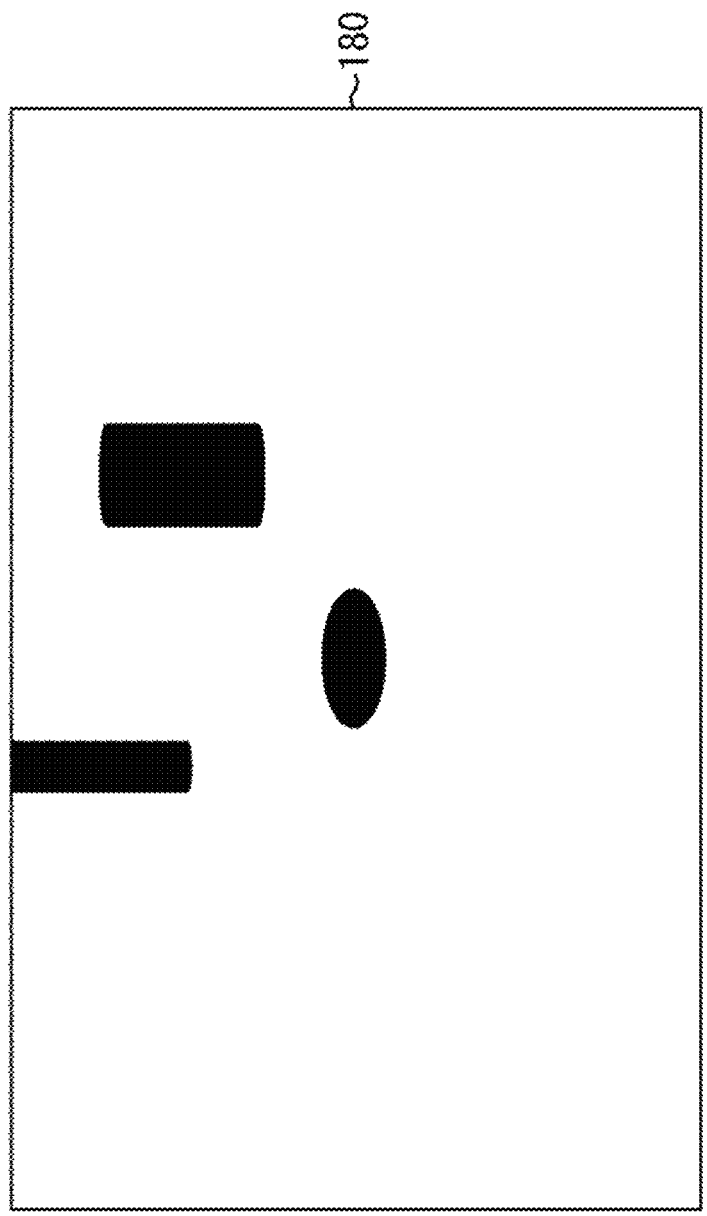
FIG. 10 is a schematic diagram depicting a typical non-polarized region map.

FIG. 10 depicts a typical non-polarized region map.

In a non-polarized region map 180 in FIG. 10, dark regions corresponding to the metallic obstacle 112, manhole cover 113, and metallic obstacle 114 each including a metal as depicted in FIG. 2 are considered non-polarized regions. When non-polarized light is emitted to the metal, the reflected light therefrom is not polarized. This makes it possible to estimate each non-polarized region to be a region corresponding to a metal.

The non-polarized region map thus generated is supplied to the low-confidence level region estimating section 56.

Alternatively, any technique other than that of extracting non-polarized regions from the polarized images may be used as the method of estimating the regions corresponding to metals.

Returning to the flowchart of FIG. 3, in step S6, the low-confidence level region estimating section 56 estimates low-confidence level regions in the millimeter-wave radar data map on the basis of the road surface region map supplied from the road surface region estimating section 54 and on the non-polarized region map from the non-polarized region extracting section 55.

Specifically, from the road surface region map and non-polarized region map, the low-confidence level region estimating section 56 extracts as low-confidence level regions the non-polarized regions in the road surface region within the range of measurement of the millimeter-wave radar 13.

Figure 11:
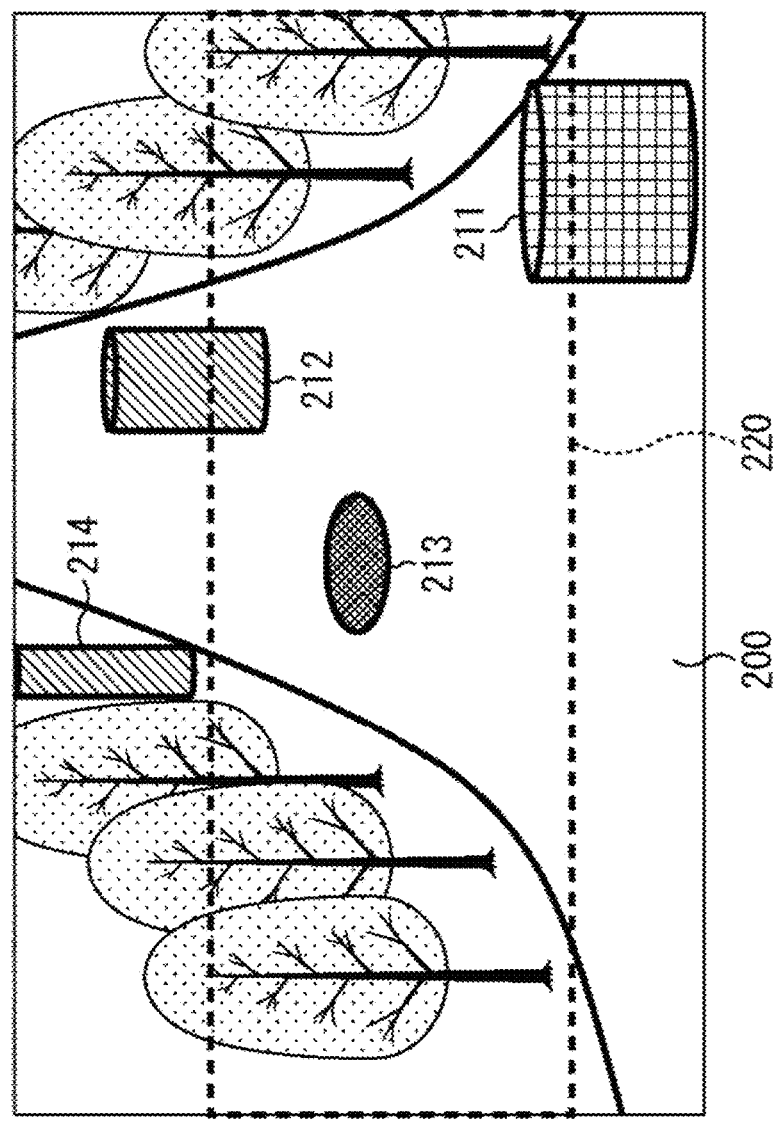
FIG. 11 is an explanatory diagram explaining the range of measurement of a millimeter-wave radar.

FIG. 11 is an explanatory diagram explaining the measurement range of the millimeter-wave radar 13.

In FIG. 11, there are regions 211, 212, and 213 corresponding to the nonmetallic obstacle 111, metallic obstacle 112, and manhole cover 113 respectively in a road surface region 200. Further, outside the road surface region 200 is a region 214 corresponding to the metallic obstacle 114. In the example of FIG. 11, a measurement range 220 of the millimeter-wave radar 13 is indicated by a broken-line rectangular frame.

In the example of FIG. 11, the non-polarized regions in the road surface region 200 are the regions 212 and 213 corresponding to the metallic obstacle 112 and manhole cover 113, respectively. That is, of the regions 212 and 213, the region included in the measurement range 220 is regarded as a low-confidence level region.

Figure 12:
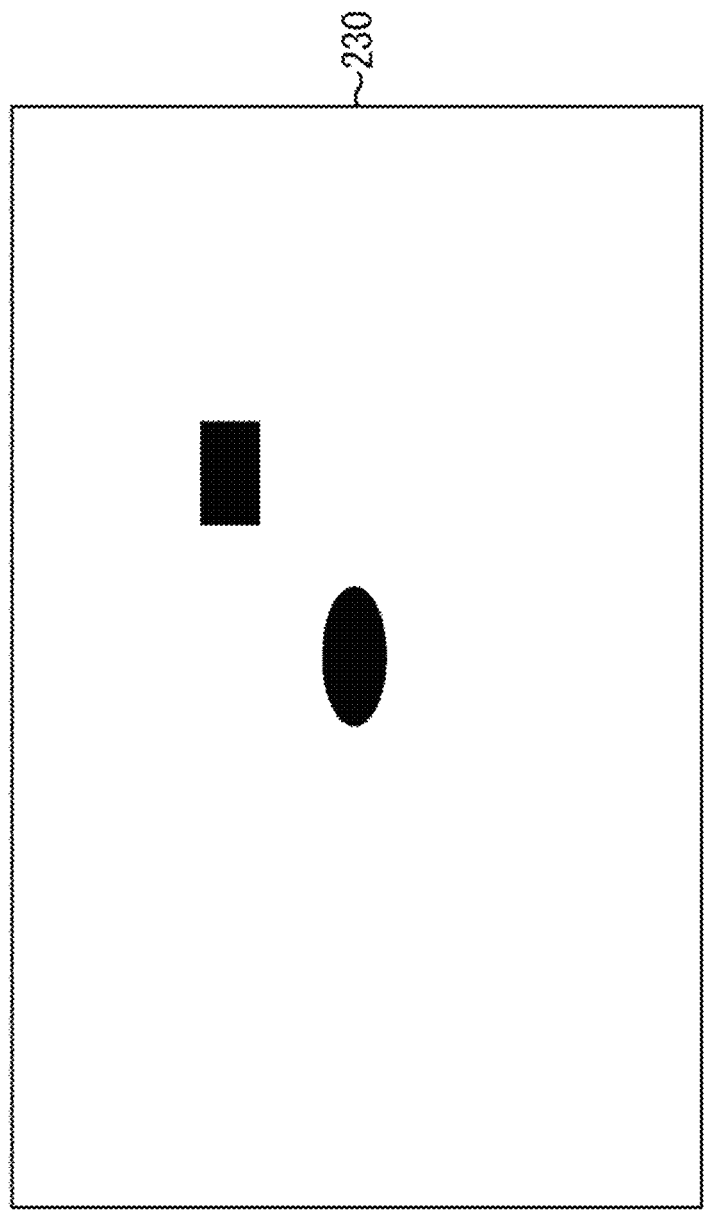
FIG. 12 is a schematic diagram depicting a typical millimeter-wave radar low-confidence level region map.

FIG. 12 depicts a typical millimeter-wave radar low-confidence level region map. The millimeter-wave radar low-confidence level region map indicates low-confidence level regions in the millimeter-wave radar data map. In this example of the millimeter-wave radar low-confidence level region map, as discussed above, the non-polarized regions indicated by the non-polarized region map are considered metallic regions that in turn are regarded as low-confidence level regions.

In the horizontal direction (x-axis direction) where low-confidence level regions exist in the measurement range 220 of the millimeter-wave radar 13, there is a possibility that the millimeter-wave radar 13 may have falsely recognized metals on the road surface as obstacles. In a millimeter-wave radar low-confidence level region map 230 depicted in FIG. 12, the dark regions corresponding to the non-polarized regions (i.e., metallic regions) on the road surface included in the measurement range 220 in FIG. 11 are considered low-confidence level regions. Using the millimeter-wave radar low-confidence level region map thus makes it possible to lower the confidence level for the regions considered metals on the road surface such as a manhole cover.

The millimeter-wave radar low-confidence level region map thus generated is supplied to the weight calculating section 60.

Returning to the flowchart of FIG. 3, after step S6, control is transferred to step S7 in the flowchart of FIG. 4. In step S7, the obstacle candidate extracting section 57 extracts obstacle candidate regions from the road surface region on the basis of the road surface region map supplied from the road surface region estimating section 54.

Specifically, the obstacle candidate extracting section 57 subtracts the road surface region from all road surface regions occupying the road surface region in the road surface region map to determine regions that can be obstacle candidate regions. That is, the regions corresponding to the nonmetallic obstacle 111, metallic obstacle 112, and manhole cover 113 on the road surface constitute obstacle candidate regions.

The road surface-related distance extracting section 58 is supplied with the road surface obstacle candidate region map indicating the regions constituting the obstacle candidates thus extracted. The road surface obstacle candidate region map indicates the candidates of the regions corresponding to objects other than the road surface in the road surface region.

Returning to the flowchart of FIG. 4, in step S8, the road surface-related distance extracting section 58 excludes the distance information related to the road surface from the stereo camera distance image given by the stereo camera evaluating section 51 in accordance with the road surface region map supplied from the road surface region estimating section 54 and with the road surface obstacle candidate region map from the obstacle candidate extracting section 57. That is, the road surface-related distance extracting section 58 extracts the distance information about the regions excluding those regarded as the road surface from the stereo camera distance image.

Specifically, if there exists at least a predetermined distance between an average of distances to a given obstacle candidate region on the road surface and an average of distances to the road surface region near that region in the stereo camera distance image, the road surface-related distance extracting section 58 leaves intact the distance information about the obstacle candidate region. Further, if the difference between the averages is less than the predetermined distance, the road surface-related distance extracting section 58 handles the distance information about the obstacle candidate region as an infinite distance. Furthermore, the road surface-related distance extracting section 58 also handles the distance information about the road surface region as an infinite distance. In this manner, there is generated a road surface-related stereo camera distance image that excludes from the stereo camera distance image the distance information about the regions related to the road surface.

Figure 13:
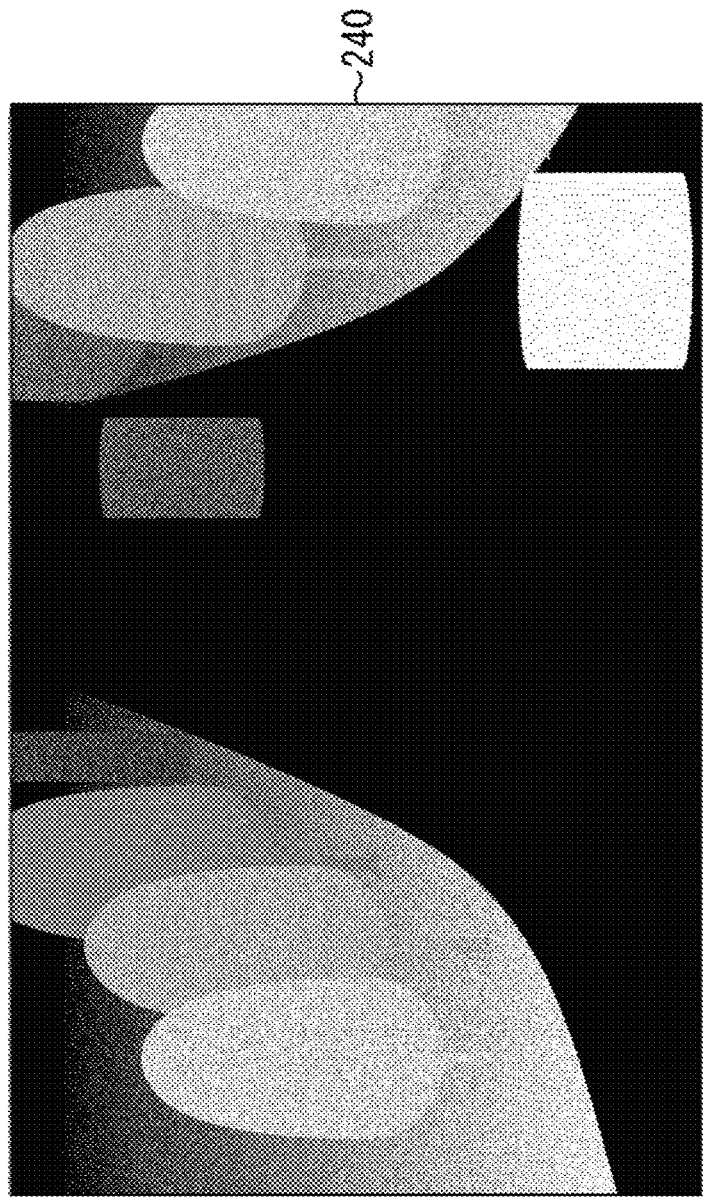
FIG. 13 is a schematic diagram depicting a typical road surface-related stereo camera distance image.

FIG. 13 depicts a typical road surface-related stereo camera distance image.

In a road surface-related stereo camera distance image 240 depicted in FIG. 13, as opposed to the stereo camera distance image given in FIG. 5, the region regarded as the road surface including the manhole cover 113 is depicted dark, i.e., as an object at an infinite distance. It is to be noted that in the road surface-related stereo camera distance image 240, the regions corresponding to the nonmetallic obstacle 111 and metallic obstacle 112 on the road surface remain as objects.

The road surface-related stereo camera distance image thus generated is supplied to the image-map converting section 59.

Returning to the flowchart of FIG. 4, in step S9, the image-map converting section 59 generates a stereo camera confidence level map on the basis of the stereo camera confidence level image supplied from the stereo camera evaluating section 51 and on the road surface-related stereo camera distance image from the road surface-related distance extracting section 58.

Specifically, the image-map converting section 59 converts the stereo camera confidence level image and the road surface-related stereo camera distance image into a x-z map, thereby generating a stereo camera confidence level map corresponding to the millimeter-wave radar data map.

Figure 14:
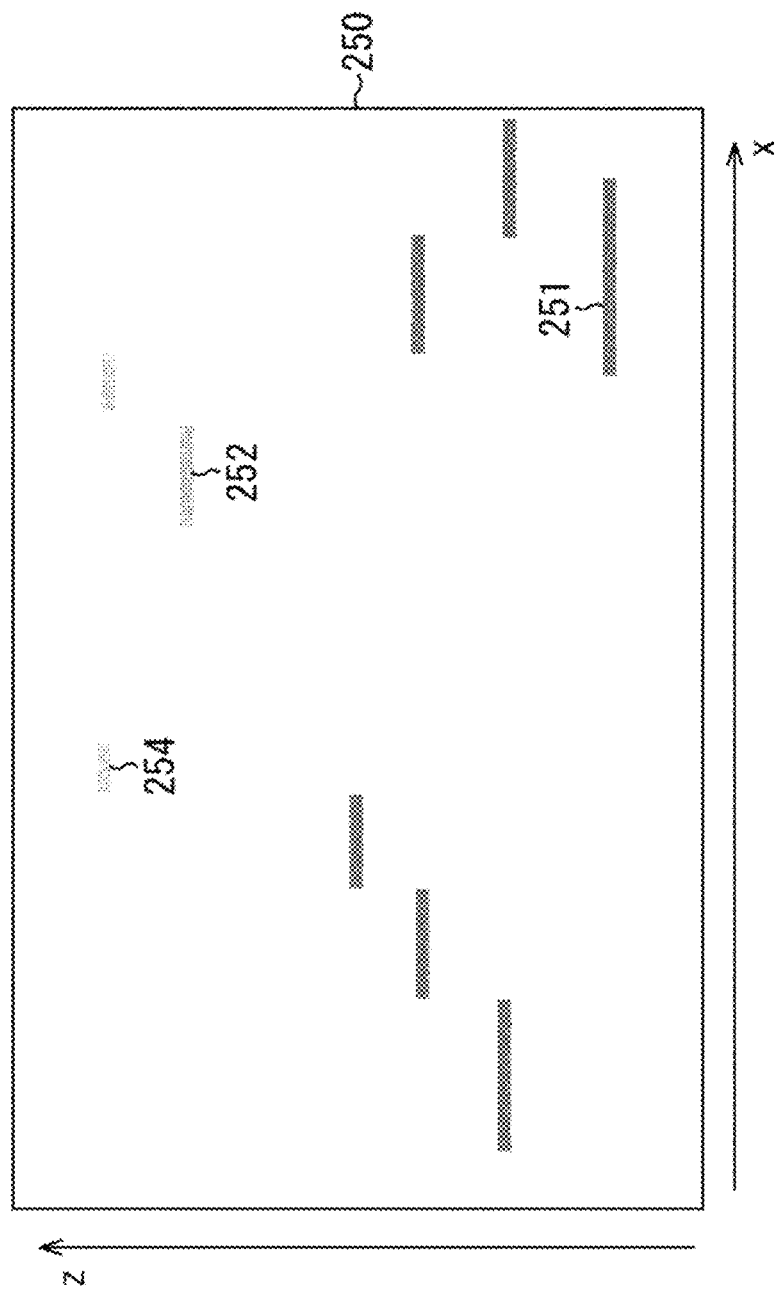
FIG. 14 is a schematic diagram depicting a typical stereo camera confidence level map.

FIG. 14 depicts a typical stereo camera confidence level map.

In a stereo camera confidence level map 250 depicted in FIG. 14, the horizontal axis (x-axis) denotes the horizontal direction and the vertical axis (z-axis) represents the depth direction. Further, the stereo camera confidence level map in FIG. 14 indicates that the darker the region, the higher the confidence level of the object corresponding to that region.

Specifically, in the example of FIG. 14, the confidence levels are high for a region 251 corresponding to the nonmetallic obstacle 111 at a short distance and for regions corresponding to trees. Further, the confidence levels are not so high for regions 252 and 254 corresponding to the metallic obstacles 112 and 114 at long distances. Incidentally, the example in FIG. 14 indicates that the manhole cover 113 is not recognized as an object.

The stereo camera confidence level map thus generated is supplied to the weight calculating section 60 and distance merging section 61.

Returning to the flowchart of FIG. 4, in step S10, the weight calculating section 60 generates a millimeter-wave radar weight map on the basis of the millimeter-wave radar data map supplied from the millimeter-wave radar evaluating section 52, on the millimeter-wave radar low-confidence level region map from the low-confidence level region estimating section 56, and on the stereo camera confidence level map from the image-map converting section 59.

Specifically, using the millimeter-wave radar low-confidence level region map, the weight calculating section 60 makes changes to lower the confidence levels corresponding to low-confidence level regions in the millimeter-wave radar data map.

Figure 15:
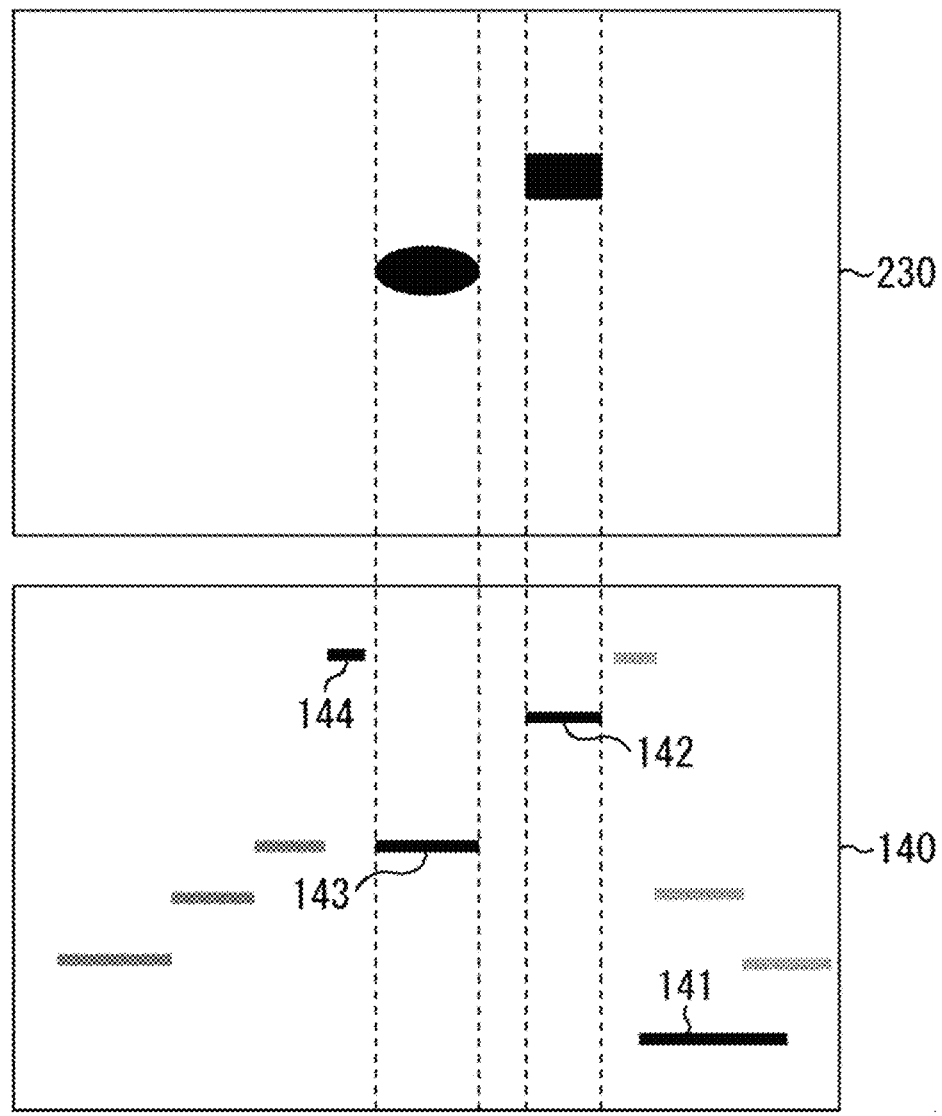
FIG. 15 is an explanatory diagram explaining confidence level changes in a millimeter-wave radar data map.

FIG. 15 is an explanatory diagram explaining how confidence levels are changed in the millimeter-wave radar data map.

The millimeter-wave radar low-confidence level region map 230 is depicted in the upper part of FIG. 15. The millimeter-wave radar data map 140 is indicated in the lower part of FIG. 15.

In the example of the millimeter-wave radar data map 140 in FIG. 15, the confidence levels are lowered for the regions 142 and 143 that have the same horizontal positions as the low-confidence level regions in the millimeter-wave radar low-confidence level region map 230.

Figure 16:
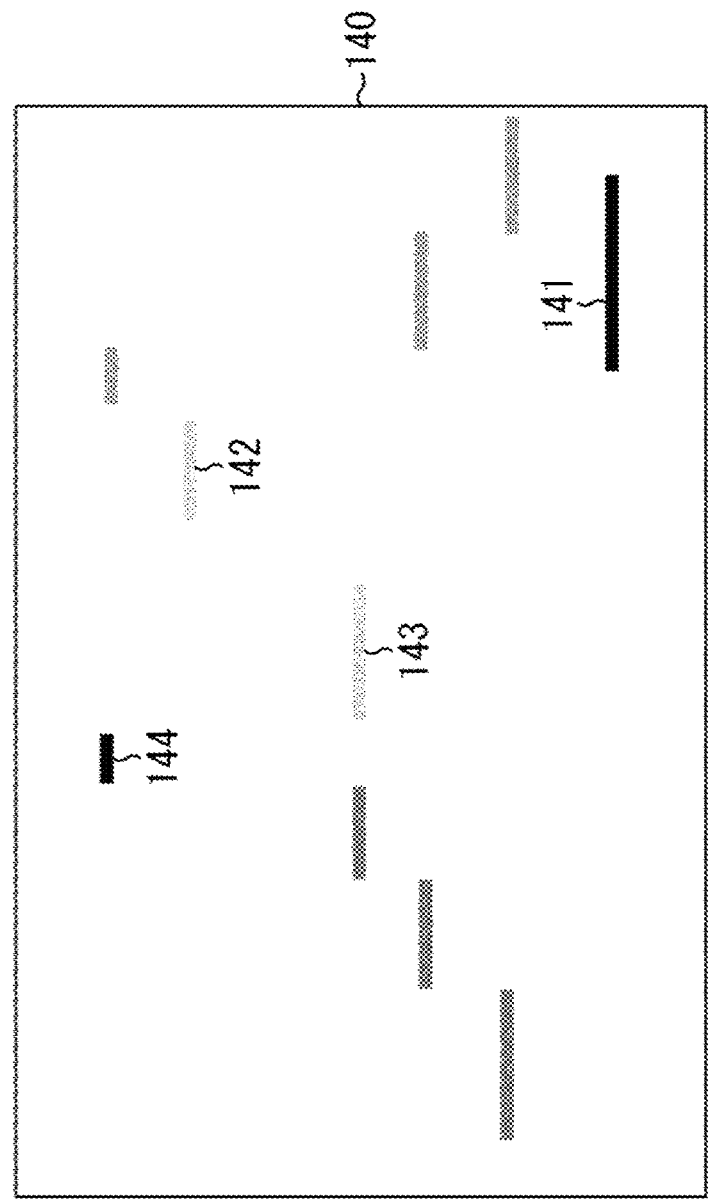
FIG. 16 is a schematic diagram depicting a typical millimeter-wave radar data map with its confidence levels changed.

FIG. 16 depicts a typical millimeter-wave radar data map with the confidence levels changed.

In the millimeter-wave radar data map 140 of FIG. 16, as compared with the millimeter-wave radar data map 140 in FIG. 7, the color indicative of the regions 142 and 143 is depicted light to indicate that their confidence levels are lowered. That is, in the example of the millimeter-wave radar data map 140 in FIG. 16, the confidence levels are lowered for the metallic obstacle 112 and for the manhole cover 113 on the road surface.

Then, the weight calculating section 60 calculates a weight $W_r$ defined by the mathematical expression (1) below using the millimeter-wave radar data map with the confidence levels changed and the values of the stereo camera confidence level map.

[Math. 1]

$$W_r = \frac{B_{mr}}{B_{sr} + B_{mr}} \qquad (1)$$

In the mathematical expression (1) above, $W_r$ denotes the weight on the confidence level of the millimeter-wave radar 13 at a position r=(x, z) in the confidence level map; $B_{mr}$ represents the confidence level of the millimeter-wave radar 13 at the position r; and $B_{sr}$ stands for the confidence level of the stereo camera 12 at the position r.

The millimeter-wave radar weight map indicating the weight $W_r$ thus calculated is supplied to the distance merging section 61.

Returning to the flowchart of FIG. 4, in step S11, the distance merging section 61 calculates the presence likelihood of objects at different distances within the imaging range on the basis of the millimeter-wave radar data map supplied from the millimeter-wave radar evaluating section 52, on the stereo camera confidence level map from the image-map converting section 59, and on the millimeter-wave radar weight map from the weight calculating section 60.

Specifically, the distance merging section 61 calculates the presence likelihood $L_r$ of the object at the position r=(x, z) defined by the mathematical expression (2) below. The larger the value of the presence likelihood $L_r$ of a given object, the higher the confidence level of the presence of that object. That is, the object is highly likely to be present.

[Math. 2]

$$L_r = B_{mr}{}^{w_r} B_{sr}{}^{(1-w_r)} \qquad (2)$$

The distance merging section 61 outputs the presence likelihood map indicating the presence likelihood $L_r$ thus calculated, and terminates the process. The presence likelihood map indicates the confidence levels of the presence of objects at different positions, in different directions, and at different distances. The larger the value of the presence likelihood, the higher the confidence level of the presence of a given object at its position, in its direction, and at its distance. In object detection, the values of the presence likelihood map are used for threshold value determination by which objects at a given distance are detected. Incidentally, the threshold values for use in threshold value determination may be calculated beforehand by experiment and learning.

In the above-described processing, if metals such as manhole covers and gratings are buried in an uphill road surface ahead of the own vehicle, distance estimation is carried out on the assumption that the confidence levels of the presence of these objects are low on the basis of millimeter-wave radar. This makes it possible to suppress false recognition of metals as obstacles on the road surface and thereby to perform correct distance estimation. Incidentally, the distances of the detected objects may be used, for example, by systems that warn the driver on board the own vehicle (i.e., vehicle having the distance estimating apparatus 11 mounted thereon) of an impending collision or by systems that control the own vehicle in a manner tracking another vehicle traveling ahead.

The series of steps and processes described above may be executed either by hardware or by software. Where these steps or processes are to be carried out by software, the programs constituting the software are installed into a suitable computer. Variations of the computer include one incorporated in its dedicated hardware, and a general-purpose personal computer or like equipment capable of executing diverse functions based on the programs installed therein, for example.

Figure 17:
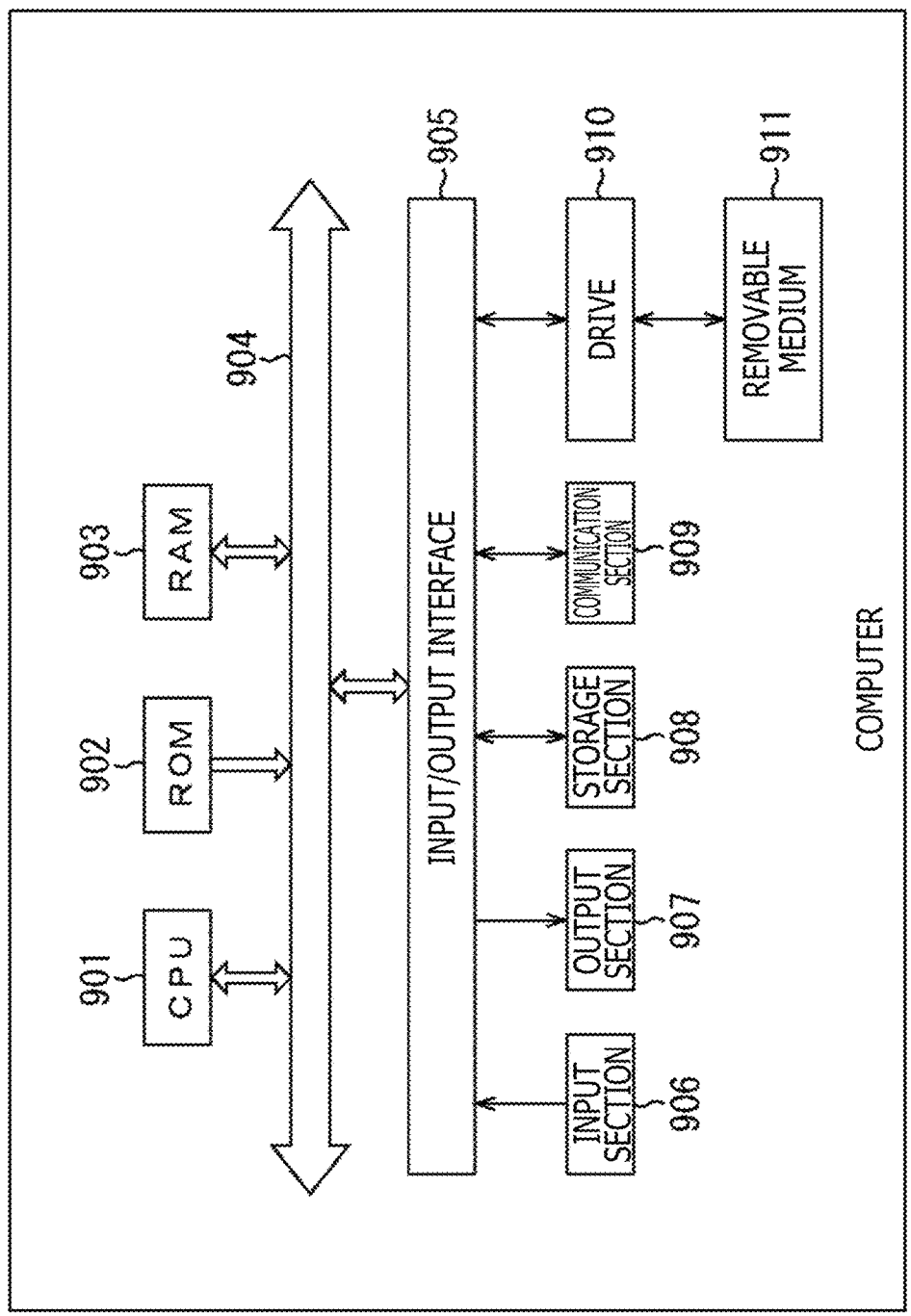
FIG. 17 is a block diagram depicting a typical functional configuration of a computer.

FIG. 17 is a block diagram depicting a typical hardware configuration of a computer that performs, by a program, the above-described series of steps and processes.

In the computer, a CPU 901, a ROM (Read Only Memory) 902, and a RAM (Random Access Memory) 903 are interconnected via a bus 904.

The bus 904 is further connected with an input/output interface 905. The input/output interface 905 is connected with an input section 906, an output section 907, a storage section 908, a communication section 909, and a drive 910.

The input section 906 includes a keyboard, a mouse, and a microphone, for example. The output section 907 includes a display unit and speakers, for example. The storage section 908 typically includes a hard disk or a nonvolatile memory. The communication section 909 typically includes a network interface. The drive 910 drives a removable medium 911 such as a magnetic disk, an optical disk, a magneto-optical disk, or a semiconductor memory.

In the computer configured as described above, the CPU 901 performs the above-mentioned series of steps and processes by, for example, loading appropriate programs from the storage section 908 into the RAM 903 via the input/output interface 905 and the bus 904 and by executing the loaded programs.

The programs to be executed by the computer (CPU 901) may be, for example, recorded on the removable medium 911 such as a packaged medium when offered. The programs may also be offered via wired or wireless transmission media such as local area networks, the Internet, and digital satellite broadcasting.

With the computer, the programs may be installed into the storage section 908 from the removable medium 911 attached to the drive 910 via the input/output interface 905. The programs may also be installed into the storage section 908 after being received by the communication section 909 via wired or wireless transmission media. The programs may alternatively be preinstalled in the ROM 902 or in the storage section 908.

Incidentally, each program to be executed by the computer may be processed chronologically, i.e., in the sequence described in this description; in parallel with other programs, or in otherwise appropriately timed fashion such as when it is invoked as needed.

It should be understood that the present technology when embodied is not limited to the above-described embodiment and that various modifications may be made without departing from the gist of the present technology.

For example, the present technology may be implemented as a cloud computing setup in which a single function is processed cooperatively by multiple networked devices on a shared basis.

Also, each of the steps discussed in reference to the above-described flowcharts may be executed either by a single device or by multiple devices on a shared basis.

Furthermore, if a single step includes multiple processes, these processes included in the single step may be executed either by a single device or by multiple devices on a shared basis.

Further, the present technology, when implemented, may be configured as follows:

(1)

An information processing apparatus including:

a road surface region estimating section configured to estimate a road surface region in a first image captured of a predetermined imaging range;

a non-polarized region extracting section configured to extract a non-polarized region from a second image captured of the imaging range;

a low-confidence level region estimating section configured to estimate a low-confidence level region for an object with a low first confidence level obtained by a first sensor within a measurement range of the first sensor in the imaging range on the basis of information indicating the road surface region and the non-polarized region;

a weight calculating section configured to calculate a weight on the first confidence level on the basis of the first confidence level, a second confidence level of the object obtained by a second sensor in the imaging range, and information indicating the low-confidence level region; and a presence likelihood calculating section configured to calculate presence likelihood of the object at different distances within the imaging range on the basis of the first confidence level, the second confidence level, and information indicating the weight.

(2)

The information processing apparatus as stated in paragraph (1) above, in which the weight calculating section calculates the weight by lowering the first confidence level corresponding to the low-confidence level region.

(3)

The information processing apparatus as stated in paragraph (2) above, further including:

a distance information extracting section configured to extract distance information about regions excluding a region regarded as a road surface with respect to the object obtained by the second sensor; and a confidence level generating section configured to generate information indicating the second confidence level using the distance information about the regions excluding the region regarded as the road surface.

(4)

The information processing apparatus as stated in paragraph (3) above, further including:

an obstacle candidate extracting section configured to extract an obstacle candidate from the road surface region on the basis of the information indicating the road surface region;

in which the distance information extracting section extracts the distance information about the regions excluding the region regarded as the road surface on the basis of distance information about a region constituting the obstacle candidate.

(5)

The information processing apparatus as stated in any one of paragraphs (1) to (4) above, in which the second image includes polarized images obtained by a polarization camera in at least three directions.

(6)

The information processing apparatus as stated in paragraph (5) above, in which the first image is the same as the second image.

(7)

The information processing apparatus as stated in paragraph (1) above, in which the first sensor is a millimeter-wave radar and the second sensor is a stereo camera.

(8)

The information processing apparatus as stated in paragraph (7) above, in which the first confidence level includes reflection intensity of the millimeter-wave radar.

(9)

The information processing apparatus as stated in paragraph (7) or (8) above, in which the second confidence level includes a stereo matching correlation value of the stereo camera.

(10)

An information processing method including the steps of:

estimating a road surface region in a first image captured of a predetermined imaging range;

extracting a non-polarized region from a second image captured of the imaging range;

estimating a low-confidence level region for an object with a low first confidence level obtained by a first sensor within a measurement range of the first sensor in the imaging range on the basis of information indicating the road surface region and the non-polarized region;

calculating a weight on the first confidence level on the basis of the first confidence level, a second confidence level of the object obtained by a second sensor in the imaging range, and information indicating the low-confidence level region; and calculating presence likelihood of the object at different distances within the imaging range on the basis of the first confidence level, the second confidence level, and information indicating the weight.

(11)

A program causing a computer to execute a process including the steps of:

estimating a road surface region in a first image captured of a predetermined imaging range;

extracting a non-polarized region from a second image captured of the imaging range;

estimating a low-confidence level region for an object with a low first confidence level obtained by a first sensor within a measurement range of the first sensor in the imaging range on the basis of information indicating the road surface region and the non-polarized region;

calculating a weight on the first confidence level on the basis of the first confidence level, a second confidence level of the object obtained by a second sensor in the imaging range, and information indicating the low-confidence level region; and calculating presence likelihood of the object at different distances within the imaging range on the basis of the first confidence level, the second confidence level, and information indicating the weight.

REFERENCE SIGNS LIST

11 Distance estimating apparatus
12 Stereo camera
13 Millimeter-wave radar
14 Polarization camera
51 Stereo camera evaluating section
52 Millimeter-wave radar evaluating section
53 Polarization angle estimating section
54 Road surface region estimating section
55 Non-polarized region extracting section
56 Low-confidence level region estimating section
57 Obstacle candidate extracting section
58 Road surface-related distance extracting section
59 Image-map converting section
60 Weight calculating section
61 Distance merging section

The invention claimed is:

1. An information processing apparatus comprising:
a road surface region estimating section configured to estimate a road surface region in a first image captured of a predetermined imaging range;
a non-polarized region extracting section configured to extract a non-polarized region from a second image captured of the imaging range;
a low-confidence level region estimating section configured to estimate a low-confidence level region for an object with a low first confidence level obtained by a first sensor within a measurement range of the first sensor in the imaging range on the basis of information indicating the road surface region and the non-polarized region;
a weight calculating section configured to calculate a weight on the first confidence level on the basis of the first confidence level, a second confidence level of the object obtained by a second sensor in the imaging range, and information indicating the low-confidence level region; and
a presence likelihood calculating section configured to calculate presence likelihood of the object at different distances within the imaging range on the basis of the first confidence level, the second confidence level, and information indicating the weight.

2. The information processing apparatus according to claim 1, wherein the weight calculating section calculates the weight by lowering the first confidence level corresponding to the low-confidence level region.

3. The information processing apparatus according to claim 2, further comprising:
a distance information extracting section configured to extract distance information about regions excluding a region regarded as a road surface with respect to the object obtained by the second sensor; and
a confidence level generating section configured to generate information indicating the second confidence level using the distance information about the regions excluding the region regarded as the road surface.

4. The information processing apparatus according to claim 3, further comprising:
an obstacle candidate extracting section configured to extract an obstacle candidate from the road surface region on the basis of the information indicating the road surface region;
wherein the distance information extracting section extracts the distance information about the regions excluding the region regarded as the road surface on the basis of distance information about a region constituting the obstacle candidate.

5. The information processing apparatus according to claim 4, wherein the second image includes polarized images obtained by a polarization camera in at least three directions.

6. The information processing apparatus according to claim 5, wherein the first image is the same as the second image.

7. The information processing apparatus according to claim 1, wherein the first sensor is a millimeter-wave radar and the second sensor is a stereo camera.

8. The information processing apparatus according to claim 7, wherein the first confidence level includes reflection intensity of the millimeter-wave radar.

9. The information processing apparatus according to claim 7, wherein the second confidence level includes a stereo matching correlation value of the stereo camera.

10. An information processing method comprising the steps of:
estimating a road surface region in a first image captured of a predetermined imaging range;
extracting a non-polarized region from a second image captured of the imaging range;
estimating a low-confidence level region for an object with a low first confidence level obtained by a first sensor within a measurement range of the first sensor in the imaging range on the basis of information indicating the road surface region and the non-polarized region;
calculating a weight on the first confidence level on the basis of the first confidence level, a second confidence level of the object obtained by a second sensor in the imaging range, and information indicating the low-confidence level region; and
calculating presence likelihood of the object at different distances within the imaging range on the basis of the first confidence level, the second confidence level, and information indicating the weight.

11. A non-transitory computer readable storage medium having computer executable instructions stored thereon that, when executed by a processor, perform a process comprising the steps of:
estimating a road surface region in a first image captured of a predetermined imaging range;
extracting a non-polarized region from a second image captured of the imaging range;
estimating a low-confidence level region for an object with a low first confidence level obtained by a first sensor within a measurement range of the first sensor in the imaging range on the basis of information indicating the road surface region and the non-polarized region;
calculating a weight on the first confidence level on the basis of the first confidence level, a second confidence level of the object obtained by a second sensor in the imaging range, and information indicating the low-confidence level region; and
calculating presence likelihood of the object at different distances within the imaging range on the basis of the first confidence level, the second confidence level, and information indicating the weight.

* * * * *